United States Patent [19]

Koishi et al.

[11] Patent Number: 4,800,548
[45] Date of Patent: Jan. 24, 1989

[54] OPTICAL RECORDING AND REPRODUCING APPARATUS WITH ABNORMALITY DETECTOR

[75] Inventors: Kenji Koishi, Kawabe; Tamotsu Matsuo, Osaka, both of Japan

[73] Assignee: Matsushita Electric Industrial Co., Ltd., Kadoma, Japan

[21] Appl. No.: 64,605

[22] Filed: Jun. 22, 1987

[30] Foreign Application Priority Data

Jun. 20, 1986 [JP] Japan ................... 61-145104
Sep. 22, 1986 [JP] Japan ................... 61-224471
Sep. 22, 1986 [JP] Japan ................... 61-224472

[51] Int. Cl.[4] ........................................... G11B 27/36
[52] U.S. Cl. ..................................... 369/54; 369/116
[58] Field of Search ................ 369/54, 116, 100, 53; 360/31; 346/76 L

[56] References Cited

U.S. PATENT DOCUMENTS

| | | | |
|---|---|---|---|
| 4,103,338 | 7/1978 | Cizmic et al. | 360/31 |
| 4,507,767 | 3/1985 | Takasugi | 369/54 |
| 4,546,462 | 10/1985 | Koishi et al. | 369/54 |
| 4,554,652 | 11/1985 | Maeda et al. | 369/54 |
| 4,570,251 | 2/1986 | Yokota et al. | 369/54 |
| 4,660,189 | 4/1987 | Tsukamura et al. | |
| 4,669,072 | 5/1987 | Miura et al. | 369/54 |
| 4,725,968 | 2/1988 | Baldwin et al. | 360/31 |
| 4,730,290 | 3/1988 | Takasago et al. | 369/54 |
| 4,757,490 | 7/1988 | Shirai et al. | |

FOREIGN PATENT DOCUMENTS

A2-0 089 021 3/1983 European Pat. Off. .
A1-0 190 349 5/1984 European Pat. Off. .
A1-0 158 193 3/1985 European Pat. Off. .

Primary Examiner—Donald McElheny, Jr.
Attorney, Agent, or Firm—Wenderoth, Lind & Ponack

[57] ABSTRACT

An optical recording and reproducing apparatus which records information on the optical disc to reproduce the information from the optical disc. It is necessary to detect the abnormal condition, when the abnormal condition has been caused while the information is recording on the optical disc, to change the optical power level of the laser light source into the non-recording condition so that the abnormal data may not be recorded on the optical disc. The track skipping which is not intended, unnecessary during the recording operation, the condition which is not the record power with the record power level being set, the motor which is rotating the optical disc causes the abnormal rotation, are the abnormal condition during the recording operation. The diagnosis function is important which confirms the positive operation of the abnormal condition detection during the recording operation, and of the write protection, because the abnormal condition during the recording operation considerably lowers the reliability of the data recorded on the optical disc.

8 Claims, 14 Drawing Sheets

OPTICAL RECORDING AND REPRODUCING APPARATUS WITH ABNORMALITY DETECTOR

BACKGROUND OF THE INVENTION

The present invention relates to an optical recording and reproducing apparatus which is adapted to record the information on a disc-shaped recording medium (disc) capable of recording, reproducing operations to reproduce the recorded information from this disc.

FIG. 3 shows the construction view of the conventional optical recording and reproducing apparatus. In the drawings, the optical disc 1 is rotated by the disc motor 20. The lights coming from the light source 21 of the semiconductor or the like are collected by the collimator lens 22 and are focused into the light spot of about $\mu m$ $\phi$ on the optical disc 1 by the focus lens 23. The reflection lights coming from the optical disc 1 are separated by the $\lambda/4$ plate 24 and the polaroid beam splitter 25 and are guided into the two-division photo detector 26. The photo detector 26 is placed so that the division line becomes parallel to the track on the optical disc 1. The tracking error signal 27 of the two-division photo detector 26 drives the focus lens 23 in the right-angled direction to the track through the tracking jumping control circuit 28 with the tracking control being applied upon it. Also, the reproducing signal output 29 is used in the reproduction of the record signal and the reproduction of the truck address. The light source 21 of the semiconductor laser or the like is set on the reproduction power or the record power by the driving circuit 30. The record signal such as the digital signal, the video signal or the like is generated by the recording signal generating circuit 31 to modulate the power of the semiconductor laser during the recording operation.

FIG. 4 shows the signal waveforms of each portion in a case where the track skipping has been caused. The b through e in FIG. 3 are the observation points of the signal waveforms b through e of FIG. 4. The a shows the track sectional view in the scanning direction of the light beam, which is a view seen from the light beam. Reference numeral 40 shows the groove track, indicating its level. Reference numeral 41 shows the flat portion between the grooves, indicating its level. Reference numeral 3 shows the track which is being recorded with the black portion shows the photographic portion. When the track skipping 8 is caused, it crosses the tracks of 4A, 4B to show that the tracking servo is applied upon the jumped track 5. FIG. 4(b) shows the output waveform of the tracking error signal 27, which becomes the track crossing signal (27A, 27B). When the tracking servo is applied upon groove track 40, the level of the error signal naturally becomes near the zero as shown in FIG. 4(b). If the falling edge of the waveforms of 27A, that is, the moment the tracking is disengaged from the track 3 which is being recorded, the track skipping 8 may be detected without the scanning operation of the record beam upon the other track. When the waveforms of the error signal 27 of FIG. 4(b) are outputted through comparison at the threshold value of 42 in the positive comparator 32 (FIG. 3), and at the threshold value of 43 in the negative comparator 33 (FIG. 3), the track skip detecting signals 44, 45 of FIG. 4(c) and (d) are provided.

In FIG. 3, the track skipping pulse signals of FIG. 4(c) and 4(d) are provided to an OR gate 34. And the flip-flop 35 is set by the output to open the analog gate 36 to break the recording signal generating circuit 31 and the semiconductor laser driving circuit 30 and to reduce from the record power to the reproduction power the optical power of the semiconductor laser driving circuit 30. FIG. 4(e) shows the light output waveforms of the semiconductor laser.

However, in such construction as described hereinabove, the track skipping cannot be correctly detected when the setting of the threshold value of the comparators 32, 33 is correct, the input level of the track crossing signal becomes smaller than at the initial setting time. Thus, it is impossible to completely prevent the error record, the double record. Also, the error record, the double record cannot be completely prevented, because the controlling operation for switching from the record power to the reproduction power cannot be effected even when the digital circuits 34, 35, 36 constituting the write protecting function break down.

As object of the present invention is to provide an optical recording and reproducing apparatus which is capable of positively preventing the error record, the double record through the diagnosis of the track skip detection, the write protecting means.

The abnormal condition wherein the photopower is not the recording power in level during the recording operation.

It is important to known whether or not the information is positively recorded in a disc in the optical recording and reproducing apparatus. Thus, when the information is on record in the disc, it is required that the photopower from the optical head should become the recording power. When the optical power is not the recording power of the object, the recording operation is immediately suspended to notify the user of it, so that the user data are protected through the abortion process. The above-described operation will be described with reference to the following drawings. A recording means of the conventional optical recording and reproducing apparatus will be mainly shown in FIG. 7 which includes an optical disc 1 with guide tracks being formed in the spiral shape therein, a disc motor 20 for rotating the optical disc at a normal speed, an optical head 103 which is adapted to linearly move in the diametral direction of the optical disc 1 by a stepping motor or a linear motor, a semiconductor laser 21 for transmitting the light transmission outputs in two front, rear directions, a condensing lens 22, a beam splitter 25, a tracking mirror 107, a focusing lens 23 which stops the light of the semiconductor laser 21 into the light of about 1 $\mu m$ in diameter on the optical disc 1, a first photodetector 109 which detects the reflection lights from the optical disc 1 to convert them into electric signals, a second photodetector 110 which converts, into electric signals, the monitor lights to be outputted from behind of the semiconductor laser 21, a preamplifier 111 which outputs as reproduction signals the variation in the quantity of the reflection lights from the optical disc, an integrator 112, a differential amplifier 113 for amplifying the difference between the output $a_o$ of this integrator 112 and a reference voltage $b_o$ to be preset by a variable resistor 114, the reference voltage $b_o$ being one for setting the oscillation level during the reproduction, for example, 1 mW, a sample holding circuit 115 which normally holds the output $g_o$ of the differential amplifier 113, a current supplying circuit (I) 116 outputs the current corresponding to the sampling value with the sample holding circuit 115 being switched from the sampling condition into the holding condition in accordance with the write gate signal, the current supplying circuit (I) 116 being adapted to drive the semiconductor laser 21 through a current adder 117, a level detecting circuit 120 which outputs such signals $d_o$ as the monitor signal corresponding to the record reproduction provided by the integrator 112 and the level $j_o$ to be set by a variable resistor 119 may become the 0 V of the "L" level of the TTL at the recording time and the 5 V of the "H" level of the TTL at the reproduction time by the use of the means of the comparator, a variable resistor 118 for setting the record power into, for example, 8 mW, a current supplying circuit (II) 122 which outputs the current $i_o$ necessary enough to output the record power into the semiconductor laser 21 corresponding to the voltage $c_o$ set by the variable resistor 118, a delay circuit for outputting the signal $f_o$ which has delayed by the use of the shift register the write gate signal $e_o$ of the terminal 121, AND circuits 125, 126, a D type flip-flop (hereinafter referred to as D-FF) constructed to be operated by the rising edge of the output of the AND 126, a CPU 128 for collectively controlling the optical recording and reproducing apparatus, and AND circuit 129 for controlling the write gate signal $e_o$ by the output of the D-F.F. 127, an analog switch 123 which is controlled with the gate signal $m_o$, the output of the AND circuit 130 for inputting the data signal l of the terminal 131 and the write gate signal $n_o$ controlled by the AND 129, the analog switch 123 is adapted to turn on and off in accordance with the data signal only at the recording time, the current adder 117 adds the currents $h_o$ $i_f$ of the current supplying circuits (I) 116, (II) 122 to flow the added currents to drive the semiconductor laser 21.

The operation of the optical recording and reproducing apparatus constructed as described hereinabove will be described hereinafter with reference to FIG. 8.

The optical head 103 is moved into the given position of the optical disc 1 to output the beam lights from the semiconductor laser 21 so that the beam spot is stopped to 1 μm or less in diameter on the optical disc 1 by the focus lens 23 through the collimator lens 22. At this time, the optical disc 1 rotates at a given speed by the disc motor 20, the beam light controls the tracking control along the guide track, detecting the guide track of the optical disc 1.

And the information recorded on the guide track of the optical disc 1 is added to a first photo detector 109 as variation in reflection factor and is converted into electric signals so that the reproduction signals are provided through the pre-amplifier 111. The reproduction time will be described hereinafter. The monitor lights from behind the semiconductor laser 21 are converted into the electric signals by a second photo detector 110, are amplified by the integrator 112, become the R portion of the signal $a_o$ shown in FIG. 8. The output is fed into the differential amplifier 113, which amplifies the difference between the signal $a_o$ and the reference voltage signal $b_o$ to be set by the variable resistor 114 to feed the signal $g_o$ corresponding to the difference to the sample holding circuit 115. At this reproduction time, the write gate signal $n_o$ of the output of the AND 129 is the "O" level, the sample holding circuit 115 is under the sampling condition. And the sample holding circuit 115 feeds the sampled value of the output signal $g_o$ of the differential amplifier 113 as it is into the current supplying circuit (I) 116. The current supplying circuit (I) 116 feeds to the semiconductor laser 21 through the current adder 117 the driving current $h_o$ corresponding to the R' portion of the output signal $g_o$ of the inputted difference amplifier 113. As the analog switching 123 is off at the reproduction time, the driving current $i_o$ of the other current adder 117 to drive the semiconductor laser 21 only with the driving current $h_o$ of the current supplying circuit (I) 116. The driving current waveform of the semiconductor laser 4 is shown in the K of FIG. 8. The output level of the beam light during the reproduction is controlled to a given value corresponding to the reference voltage $b_o$ by such operation as described hereinabove. Namely, during the reproduction, the operation is performed to stabilize the oscillation output with respect to the semiconductor laser 21.

The operation will be described hereinafter at the recording timing. The write gate signal $n_o$ of the output of the AND circuit 129 becomes the "1" level, the sample holding circuit 115 memories the input signal level of the R's of the output signal $g_o$ of the differential amplifier 113 immediately before it and become a hold condition. The held signal level $R'_H$ is supplied to the current supplying circuit (I) 116 to generate the current $h_H$ for driving the semiconductor laser immediately before the condition becomes a hold condition to addi it to the current adder. On the other hand, in order to record the information, the data signal $l_o$ of approximately 1 MHz through 2 MHz in frequency to the terminal 131 switches on, off the analog switch 123 through the AND circuit 130. Namely, when the data signal $l_o$ is "1" in level, the analog switch 123 becomes on, when the data signal "0" in level, the analog switch 123 becomes off. When the analog switch 123 is turned on, off by the data signal $l_o$, the output current i of the current supplying circuit (II) 122 is added or is not added to the current adder 117, so that the current for driving the semiconductor laser 21 becomes the driving current of the $h_H$ or the driving current of the $h_H+i$. Accordingly, the data bit corresponding to the data signal $l_o$ is formed in the guide track of the optical disc 1. At this time, the monitor light corresponding to the record beam light is inputted into the second photo detector 110. At this time, the output signal $a_o$ of the integrator 112 becomes high in level as shown in the W portion of FIG. 8.

The output $a_o$ of the integrator 112 becomes 0 V at the time of the record power, +5 V at the reproduction time as shown in the $d_o$ of FIG. 8 through the comparison between the voltage $j_o$ to be set by the variable resistor 119 and the level detecting circuit 120.

On the other hand, the write gate $e_o$ is delayed by the delay circuit 124 composed of the shift register, the signal $e_o$ for getting the $f_o$ in FIG. 8 and the $f_o$ are added to the AND circuit 125 so that the record optical power detecting section signal is provided for observing the record power delayed more than the original write gate $e_o$ of the terminal 121 as shown in FIG. 8, $o_o$.

In the detecting section, the output of the level detecting circuit 120 is the 0 V of the "L" level of the TTL as shown in FIG. 8, $d_o$. Thus, the output of the AND circuit 126 becomes normally the "L" level. The Q output $p_o$ becomes the "H" level with the D-F.F. 127 being not set, so that the output $n_o$ of the AND circuit 129 becomes equal to the write gate signal $e_o$ of the terminal 121. And the output $n_o$ of this AND circuit 129 is added to the AND circuit 130 to control the laser driving circuit.

When the output $d_o$ of the level detecting circuit 120 does not become the record optical power because of the breakdown of the semiconductor laser or the disorder of the semiconductor laser driving circuit during the record light power detecting section of the output of the AND circuit 125, the output $a_o$ of the integration amplifier 112 is provided as in FIG. 8, $a'_o$. Thus, the output $d_0$ of the level detecting circuit 120 becomes also +5 V which is the "H" level of the TTL despite the recording time as in FIG. 8, $a'_o$. Thus, the output $d_o$ of the level detecting circuit 120 becomes also +5 V which is the "H" level of the TTL despite the recording time as in FIG. 8, $d'_o$. At time time, the D-F.F. 127 is set, the output $p_o$ of the Q becomes the "L" level from the record power breakdown. The original write gate $e_o$ of the terminal 121 is forced to close by the AND circuit 129 as shown in FIG. 8 $n'_o$. Namely, this is a light fort function. A write protecting circuit 132 is composed of the delay circuit 124, the AND circuits 125, 126, 129 and the D-F.F. 127. When the write protecting function works, the Q output $p'_o$ of the D-F.F. 127 is added to the interruption input which is the input port of the CPU 128, so that the CPU 128 recognizes this abnormal condition. And the CPU 128 performs its abort processing operation to report through the interface that the light fort has been caused in the host during the processing operation. Finally the CPU 128 clears the D-F.F. 127 by the outport of the CPU 128 to complete a series of processing operations.

However, such conventional construction as described hereinabove had a problem that the data the user tries to save in this record reproducing apparatus was required to be removed when the write protector did not function for some reasons.

Accordingly, an object of the present invention is to provide an optical recording and reproducing apparatus, wherein this positive operation of this function may be recognized in the processing of the diagnosis.

The processing operation will be described hereinafter in a case where the disc motor for rotating the optical disc has been wrong during the recording operation.

In the optical recording and photorecord reproducing apparatus, it is important to record at the normal rotation speed on the track of the disc through the rotation of the disc at the normal rotation speed when the information is recorded on the disc.

Referring now to the drawings, there is shown in FIG. 10, an optical and reproducing apparatus with the motor driving portion and the recording portion as the main units, which includes an optical disc 1 with the guide track being spirally formed, a disc motor 20 for rotating the optical disc at the normal speed, an optical head 103 which is adapted to be linearly driven in the diametrical direction of the optical disc 1 by a stepping motor or a linear motor not shown, a semiconductor laser 21 for transmitting the light emitting output in two front, rear directions, a focus lens 22, a beam splitter 25, a tracking mirror 107, a diaphragm lens 23 which focuses the light of the semiconductor laser 21 into the light of about 1μm in diameter on the optical disc 1, a first photo detector 109 which detects the reflection lights coming from the optical disc 1 to convert them into electric signals, a second photo detector which converts into the electric signals the monitor lights to be outputted from behind the semiconductor laser 21, a pre-amplifier 111 which may output the variation in the reflection light quantity from the optical disc as the reproduction signals, a current supply circuit (I) 116 which causes the current of the semiconductor laser driving operation at the reproduction time, a variable resistor 114 which sets to, for example, 1 mW the optical power to be outputted from the optical head during the reproduction, a current supply circuit (II) 122 for producing the current of the semiconductor laser driving operation during the recording operation, a variable resistor 118 which is adapted to set to, for example, 8 mW the optical power to be outputted from the optical head during the recording time, an analog switch 123 which are controlled by the gate signals that are outputs of the AND circuit 219 with the data signal $l_o$ of the terminal 131 and the write gate signal $e_o$ of the terminal 121 as outputs, the analog switch 123 is turned on and off in accordance with the data signal only during the recording operation, a current adder 117 adds the currents $h_2$, $i_2$ of the current supply circuits (I) 116, (II) 122 to flow the added current to drive the semiconductor laser 21, a motor driving circuit 221 for driving the disc motor 20, a motor synchronism detecting circuit 222 for detecting whether or not the disc motor 20 is operated at the normal rotation speed, a CPU 128 which turns on, off the disk motor 20, and controls the entire optical recording and reproducing apparatus.

The operation of the optical recording and reproducing apparatus constructed as described hereinabove will as described hereinabove.

When the optical disc 1 is engaged on the disc motor 20, the CPU 128 outputs the motor start signals from the outport (1) into the motor driving circuit 221. The motor driving circuit 221 rotates the disc motor 20. When the disc motor 20 becomes the normal revolution number, the motor synchronism detecting circuit 222 detects it to add the motor synchronism signal $f_2$ to the import (1) of the CPU 128 to notify the CPU 128 of the correct motor synchronization. The CPU 128 moves the optical head 103 to the given position of the optical disc 1.

The beam light is outputted from the semiconductor laser 21 to focus the beam spot to 1 μm or lower in diameter on the optical disc 1 by the focus lens through the condenser 22. At this time, the optical disc 1 is rotated at a given speed by the disc motor 20, the beam light performs the tracking controls along the guide track, detecting the guide track of the optical disc 1.

And the information recorded on the guide track of the optical disc 1 is added onto the first photo detector 109 as changes in the reflection factor and is converted into electric signals so that the reproducing signals are provided through the pre-amplifier 111. The operation about the reproduction will be described hereinafter. The monitor light coming from behind the semiconductor laser 21 is converted into the electric signals by the second photo detector 110 and is added to the current supplying circuit (I). The current supplying circuit (I) stably controls the oscillation output of the semiconductor laser 21 independently of the temperature or the like through the reference voltage to be set by the variable resistor 114 to apply upon the current adder 17 the current $c_2$ where the optical power, during the reproduction of, for example, 1 mW is normally applied upon the optical disc. As the analog SW 123 is normally off during the reproduction time, the current $d_2$ of the other current supplying circuit (II) 122 is driven by the semiconductor laser 21 only through the current $c_2$ of the current supplying circuit (I) 116 without applying upon the current adder 117.

The operation during the recording operation will be described hereinafter. First, the write gate signal $e_o$ of the terminal 18 becomes "1" level, the current supplying circuit (I) 116 samples the control voltage equivalent to the current $c_2$ just prior to it to hold the control voltage. While the write gate signal b is "1", he current $C_H$ corresponding to the control voltage held is normally held into the current adder 117. On the other hand, to record the information, the data signal a of about 1 MHz through 2 MHz in frequency to the terminal turns on, off the analog switch 123 through the AND circuit 219. Namely, the analog switch 123 is turned into the ON condition when the data signal $l_o$ is "1" level, the analog switch 123 is turned into the OFF condition when the data signal $l_o$ is "0" evel. The analog switch 123 is turned on, off by the data signal $l_o$ to apply the output current $d_2$ of the current supplying circuit (II) upon the current adder 117 or not to apply the output current upon it, so that the current $k_2$ for driving the semiconductor laser 21 becomes the driving current of $C_H$ or $C_H + d_2$ as shown in FIG. 3.

Accordingly, data bits corresponding to the data signal 131 are formed upon the guide track of the optical disc 1.

In this case, it is important to know whether or not the information is positively recorded on the disc. Thus, when the information is recorded in the disc, it is demanded that the disc should be normally rotated to record the record data at the normal pit length. Therefore, it is demanded to protect the user data through the immediate compulsory suspension of the recording operation to notify the user of it for the aborting operation when the disc has not been correctly rotated during the recording operation. Also, it is important for the user himself to previously know the positive operation of the write protective function, which is adapted to compulsorily stop the recording operation.

The present invention is an optical recording and reproducing apparatus comprising means for detecting the track jumping by the track crossing signal, a write protecting means which reduces the optical power from the record power to the reproduction power by the track jump detecting means, a diagnostic means for confirming whether or not the track jump detecting means and the write protecting means normally operate.

The artificial write gate is caused at the resetting time or the like of the apparatus by such construction to cause the track crossing signal through the starting operation of the track jump during the artificial write gate production period, the diagnosis is performed to confirm the correct operation of the track jump detecting means and the lighting means to positively prevent the error record, the double record to be caused by the track jump.

Also, the present invention is an optical recording and reproducing apparatus comprising means for monitoring the optical power, write protecting means which compulsorily prohibit the record when the light monitor signal is not detected as the recording condition at the recording time, means for artificially generating the write gate signals during the diagnostic, means for confirming whether or not the write protection operated. The light power performs the diagnosis, by such construction as described hereinabove, during the reproduction, the CPU which is an artificial write gate signal generating means artificially outputs the write gate signal when the detection signal of the power monitor means becomes a reproducing condition at this time. When the signal has been outputted, the write protecting means function. And the CPU confirms that the write protecting means has functioned.

Furthermore, the present invention is an optical recording and reproducing apparatus comprising a disc motor driving means, a motor synchronism detecting means of the disc motor, a means for recording the information on the disc, a write protecting means which compulsorily prohibit the record operation when something has been wrong during the recording operation, a means to externally notify that the write protecting means has operated. Also, the present invention is an optical recording and reproducing apparatus comprising a means which artificially turns the condition into the recording condition during the diagnosis, a means which intentionally turns the motor synchronizing signal into the signal to be equivalent to the abnormal time. When the rotation of the disc motor which rotates the disc during the recording operation has become abnormal, the write protecting function operates to perform the compulsory prohibition in accordance with such construction. Also, in the present invention, the condicial tion is artificially kept on record condition when the motor synchronizing signal is normal in the diagnosis. Furthermore, the motor synchronizing signal is intentionally made abnormal by the suspension of the disc motor driving operation. At this time, it is confirmed that the write protecting function has functioned.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
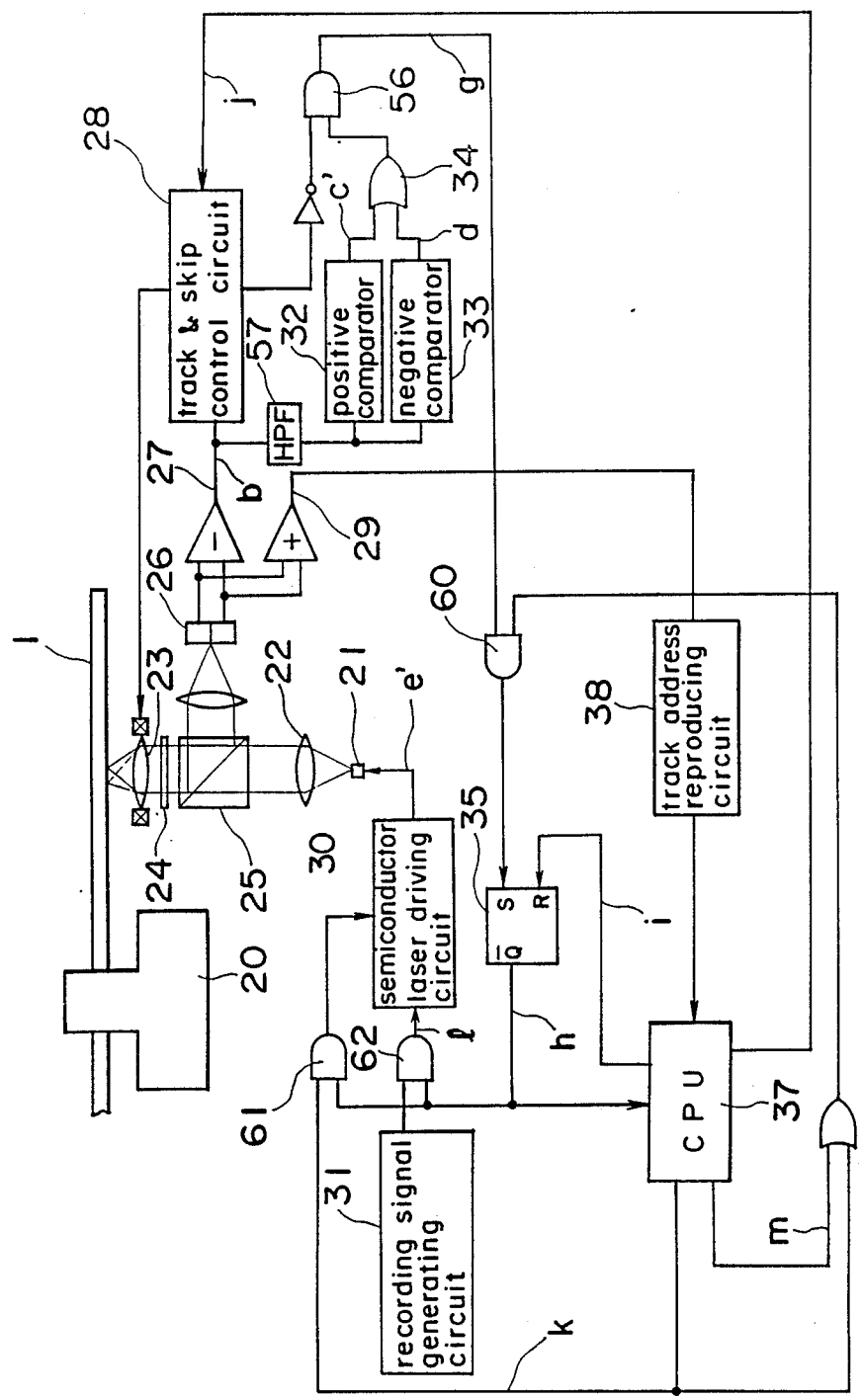
FIG. 1 shows block diagrams of an optical recording and reproducing apparatus in a first embodiment of the present invention.

Before the description of the present invention proceeds, it is to be noted that like parts are designated by like reference numerals throughout the accompanying drawings.

Referring now to the drawings, there is shown the construction view of the optical recording and reproducing apparatus in the first embodiment of the present invention.

Figure 2:
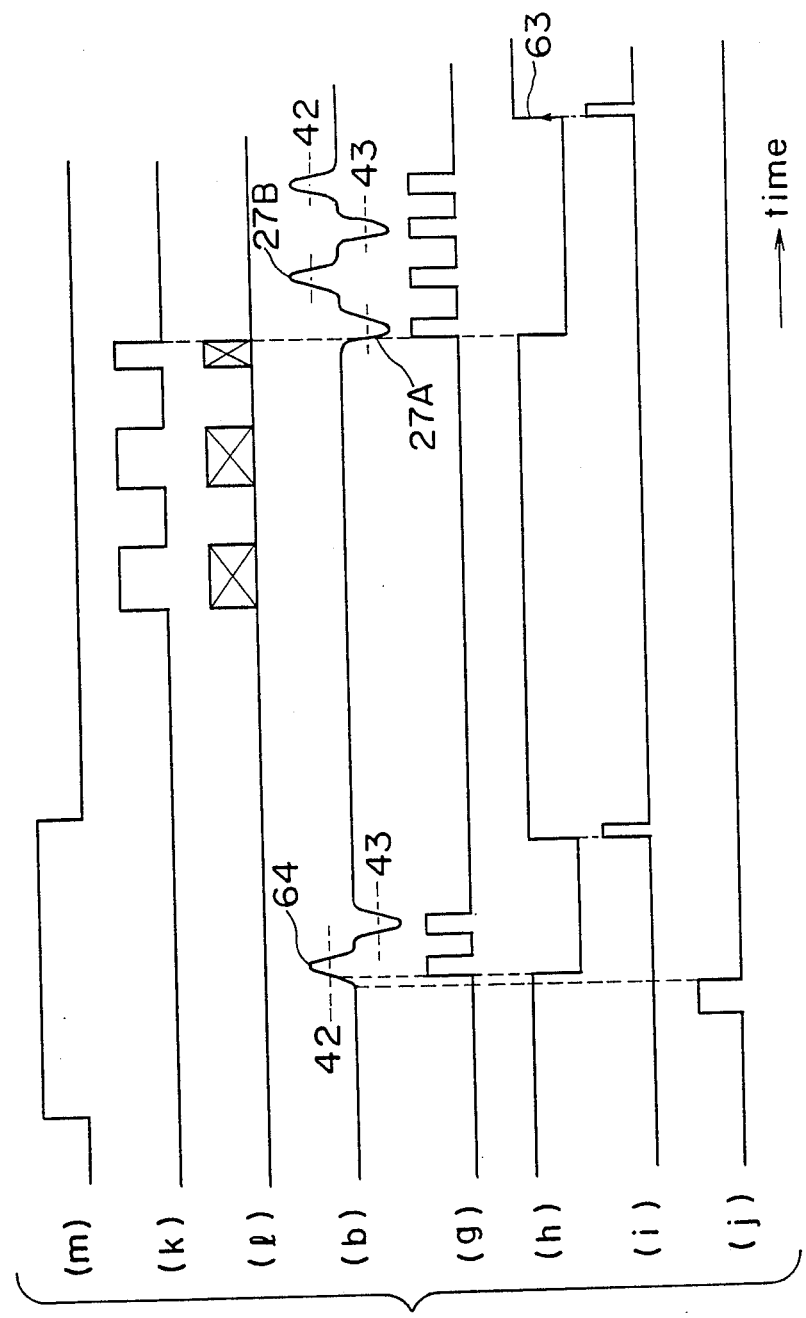
FIG. 2 shows operation waveform charts of the same embodiment.

When the write gate signal K is outputted from the CPU, the recording signal 1 is inputted into the semiconductor laser driving circuit 30 from the recording signal generating circuit 31 to modulate the recording light. FIG. 2 shows the signal waveform charts in each portion of FIG. 1. The write gate signal K is inputted into the AND gate 60, the signal g which is the track crossing signal binary-coded by the comparators 32, 33 may be inputted into the flip-flop 35. If the track skipping is caused, the track crossing signal (FIG. 2, 27A, 27B) is caused, the flip-flop 35 is set, the Q output becomes L in level as shown in FIG. 2($h$). Accordingly, the AND gates 61, 62 are turned off and the gate signal K, the recording signal 1 are inputted into the semiconductor laser driving circuit 30 no longer. The condition becomes the reproducing one from the recording condition simultaneously with the track skipping to prevent the double recording or the error recording. The write protecting signal h is released (FIG. 2, 63) by the resetting signal i after the track address which is being reproduced at the present time is sent to the CPU 37 and is confirmed by a track address reproducing circuit 38.

Figure 14:
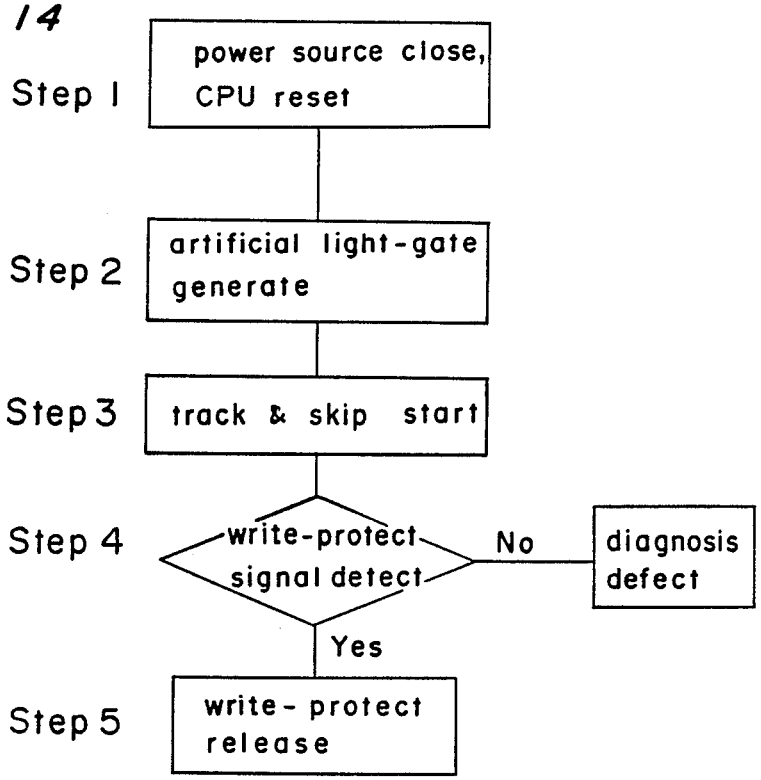
FIGS. 14–16 are flow charts of the program of the CPU.

The diagnosis method for the operation confirmation of the abnormal track detection, the write protecting function will be described hereinafter with the flow chart (FIG. 14) of the CPU program. This diagnostic means function is operated at the power on of the optical recording and reproducing apparatus shown in FIG. 1 or at the CPU resetting time (step 1). The artificial write gate signal m from the CPU 37 is outputted from the outport (step 2). Then, one normal track jumping is forced to be performed to confirm the abnormal track skip detection. Thus, the track jump starting signal J is inputted into the tracking jumping control circuit from the CPU 37 (step 3). The track crossing signal 64 is caused by one normal track jumping, the binary-coded signal g passes the AND gate 60 which has been inputted by the artificial write gate signal to set the flip-flop 35 so that the $\overline{Q}$ output (write protecting signal h) becomes L in level. The CPU reads this write protecting signal h from the import to confirm that the operations of the normal track skip detection, the write protecting function are normal (step 4), to output the resetting signal i of the write protection (step 5). At this time, the artificial write gate signal m is not inputted into the semiconductor laser driving circuit 30 and the condition does not become the record power one. Accordingly, it is possible to perform the diagnosis of checking the normal track skip detection, the write protecting function without actually turning the semiconductor laser into the record mode.

As described hereinabove, according to the present embodiment, the artificial write gate signal is caused, the track jump is started while the artificial write gate signal is being generated to cause the track crossing signal. The diagnosis function for confirming the correct operation of the abnormal track skipping detection and the write protecting function is provided, so that the diagnosis may be performed without turning the semiconductor laser into the record power condition. Thus, the error recording, the double recording may be positively prevented, which are caused by the abnormal track skipping.

As described hereinabove, according to the present invention, the diagnosis function for confirming the correct operation of the abnormal track skip detecting means and the write protecting means may be operated with the artificial write gate signal without causing the abnormal track skipping under the recording condition. The abnormal track skipping detection and the write protecting function which are provided to completely prevent the error recording, the double recording, which cause the unexpected abnormal track skipping, thus resulting in considerable improvements in the recording data reliability on the optical disc.

Figure 5:
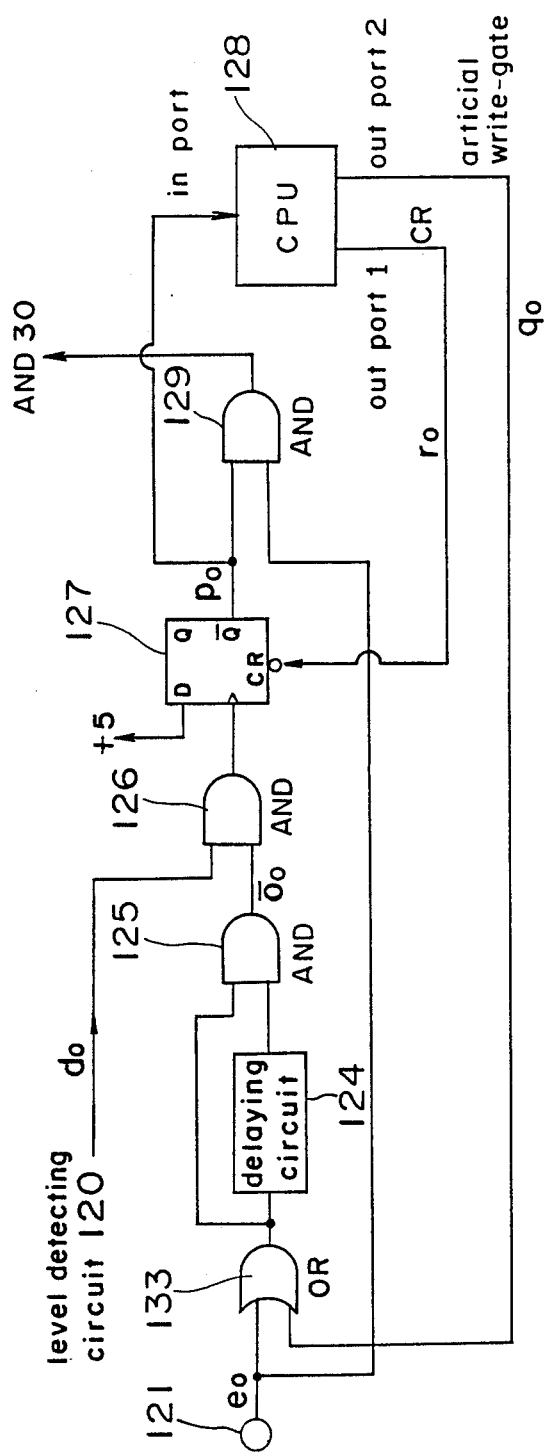
FIG. 5 is a circuit diagram showing a second embodiment in the present invention.
Figure 7:
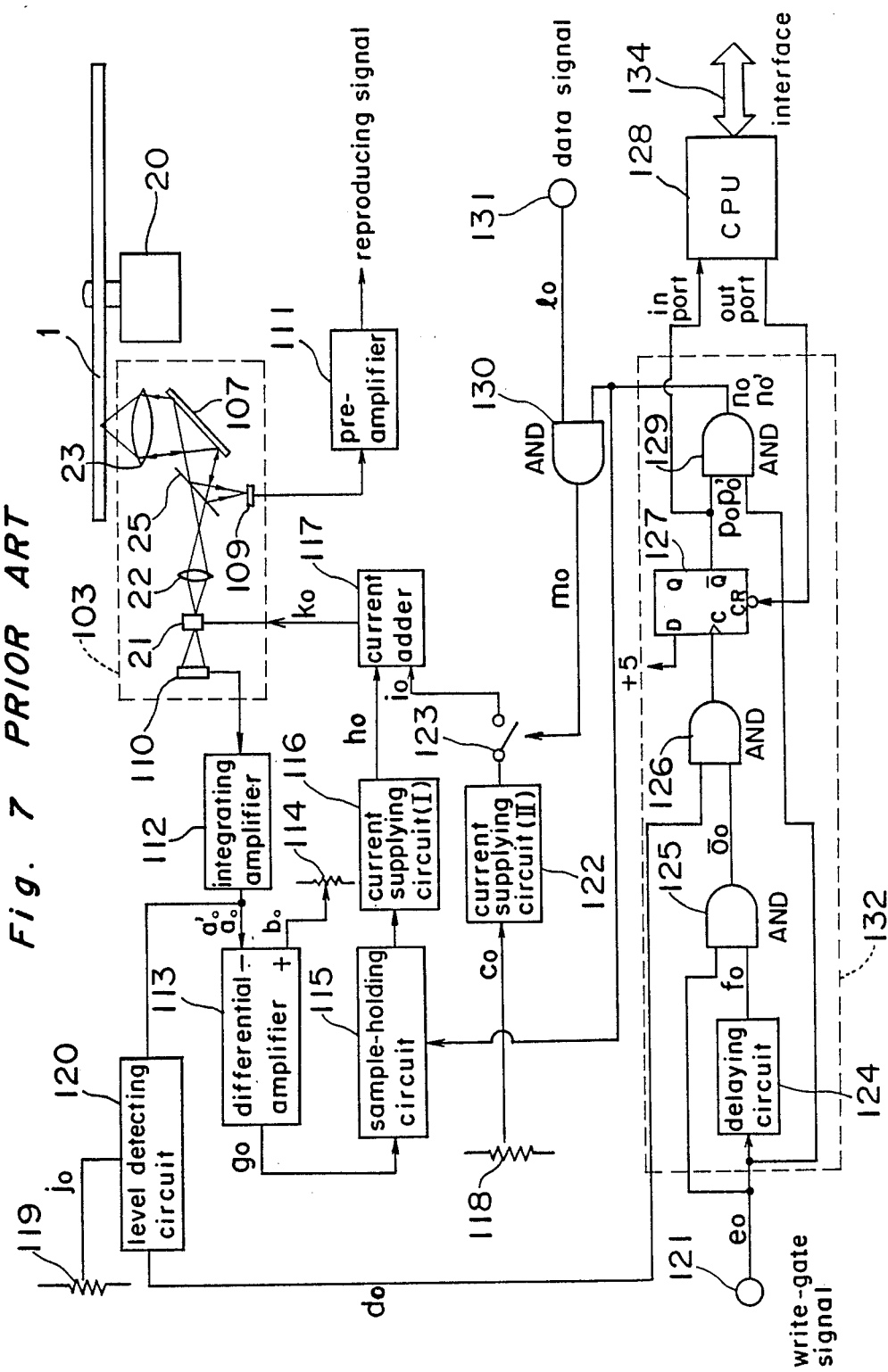
FIG. 7 shows block diagrams of the conventional optical recording and reproducing apparatus.
Figure 8:
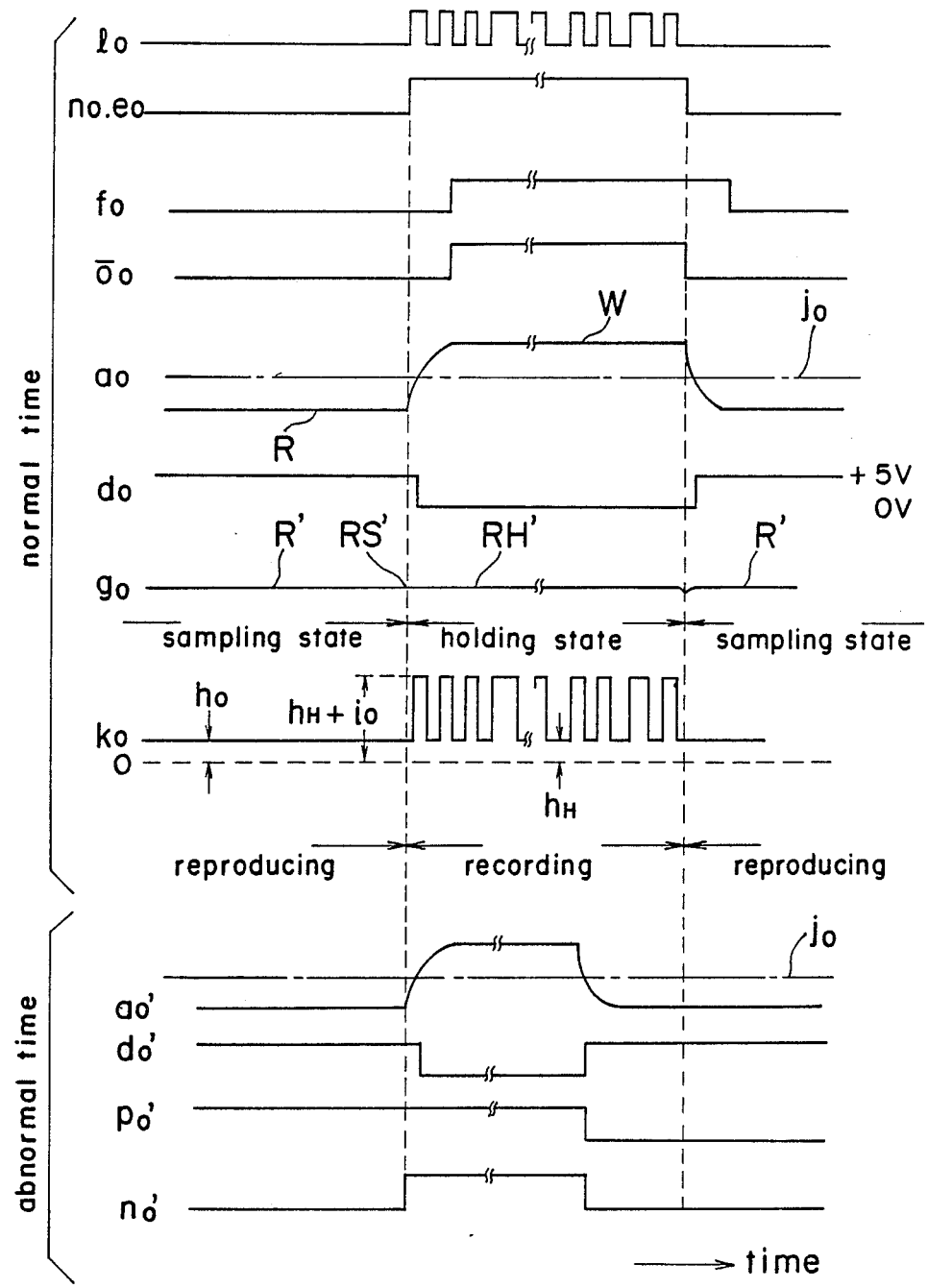
FIG. 8 shows signal diagrams for explaining the conventional embodiment.

The second embodiment of the present invention will be shown in FIG. 5. The write protecting circuit portion 132 of FIG. 7 is mainly shown in FIG. 5.

Figure 6:
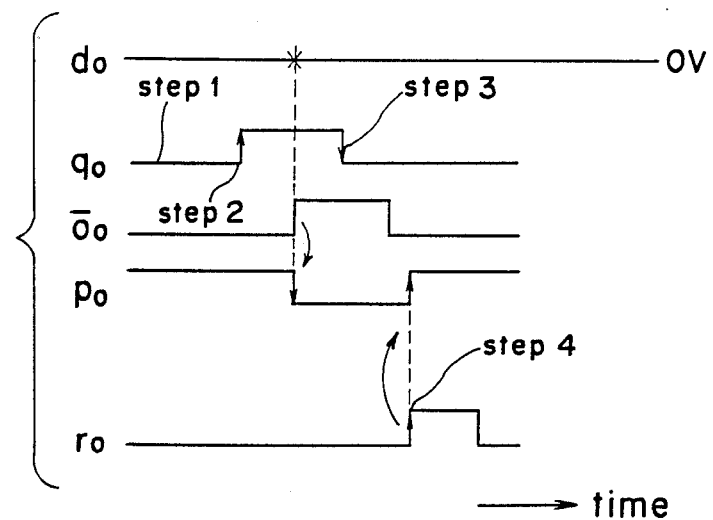
FIG. 6 shows signal diagrams for explaining the operation of the embodiment.
Figure 15:
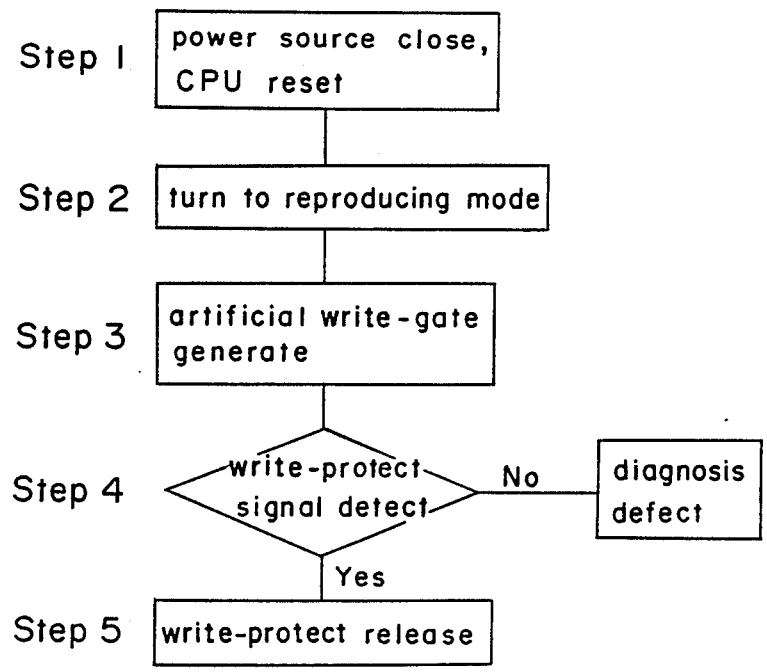

The operation of the present invention will be described hereinafter with reference to FIG. 5, FIG. 6 and the flow charts of the CPU program shown in FIG. 15. The CPU 128 of the optical recording and reproducing apparatus carries out the following procedure with the power supply ON (step 1) of the optical recording and reproducing apparatus or through the diagnosis command from the host. The optical recording and reproducing apparatus is put into the reproducing mode (step 2) as the step 1. At this time, the write gate $e_o$ is not applied upon the terminal 121. And the output $d_o$ of the level detecting circuit 120 is the $+5$ V of the "H" of the TTL. Then, as the step 2, the CPU 128 outputs the $q_o$ of FIG. 6 as the artificial write gate from the out port 2 (step 3). The level is the "H" level of the TTL during the recording in the $q_o$. The artificial write gate $q_o$ is added to the delay circuit 124 through the OR circuit 133, record optical power detecting section signal $o_o$ is obtained as described in the paragraph of the conventional art. As the output $d_o$ of the level detecting circuit 120 when this $o_o$ has become active becomes "h" level, the AND circuit 125 becomes the active "H" level to set the D-F.F. 127. And the output $P_o$ of the D-F.F. 127 is added into the interruption input of the CPU 128. As the step 3, the CPU 128 detects (step 4) that the write protecting function has performed through the input of the interruption to suspend the output of the artificial write gate of the out port 2. As the step 4, the CPU 128 outputs the clear pulse $r_o$ from the out port 1 to restore the condition into the initial condition (step 5).

The diagnosis for confirming the write protecting function is completed by the above-described steps. Even if the write signal is artificially generated, the optical power does not become the optical power as it is added simply to the write protecting portion.

The present invention is capable of diagnosis the write protecting function through the addition of the simple hard, soft. Thus, in a case where the user data cannot be filled up on the record medium, because the record power is not caused through something wrong with the semiconductor laser, the semiconductor laser driving circuit or the like when the user is writing the data on the record medium, it may be confirmed in advance that the function of reporting to the user the light fort condition caused will positively work. Thus, it is ensured that the user cannot lose the data which have been tried to be saved on the record medium, so that the user may use the optical recording and reproducing apparatus as an external memory apparatus.

Figure 9:
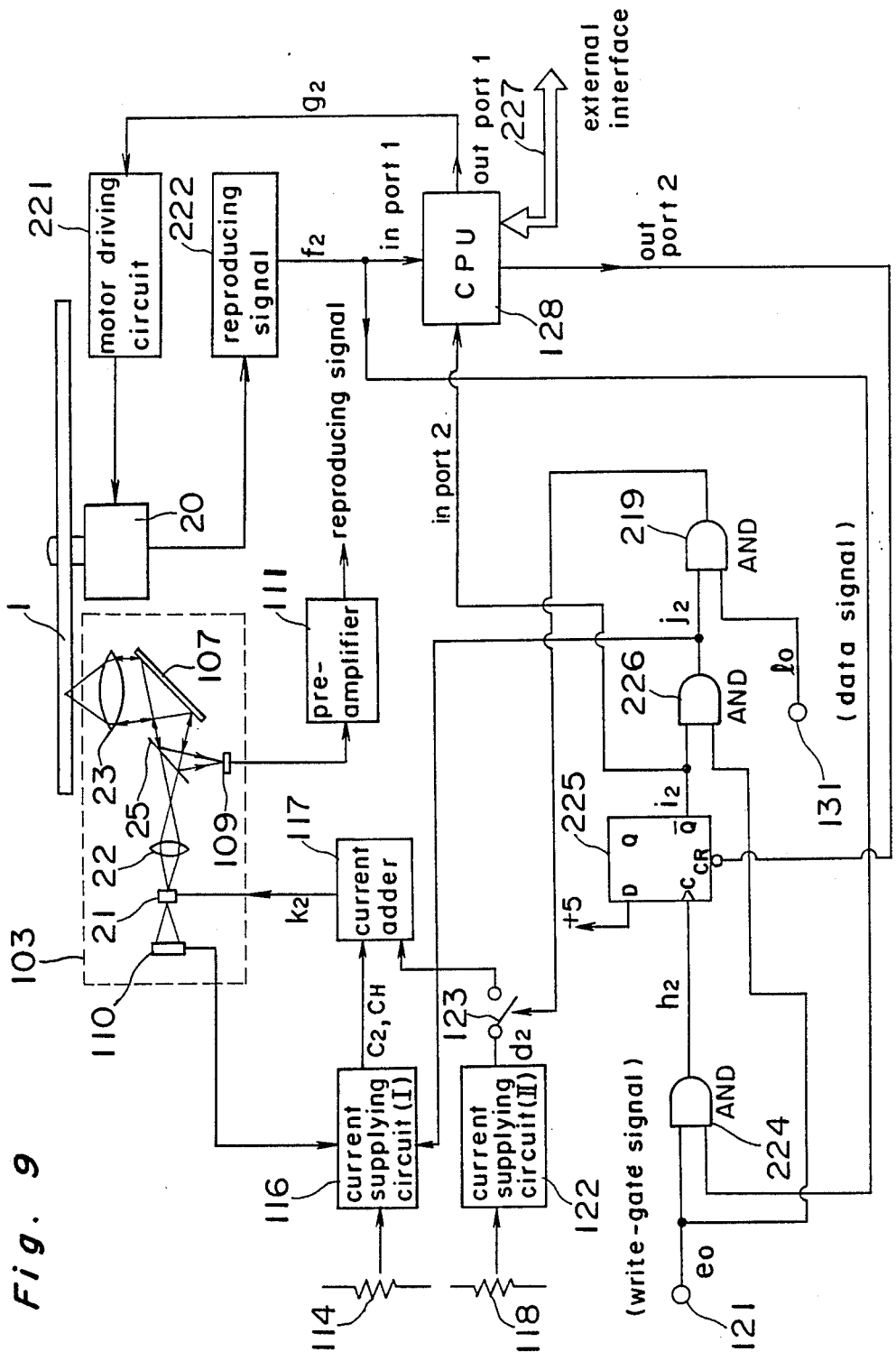
FIG. 9 shows block diagrams showing a third embodiment in the present invention.

A third embodiment of the present invention will be shown in FIG. 9. It is to be noted that like parts are designated by like reference numerals throughout the accompanying drawings.

Figure 10:
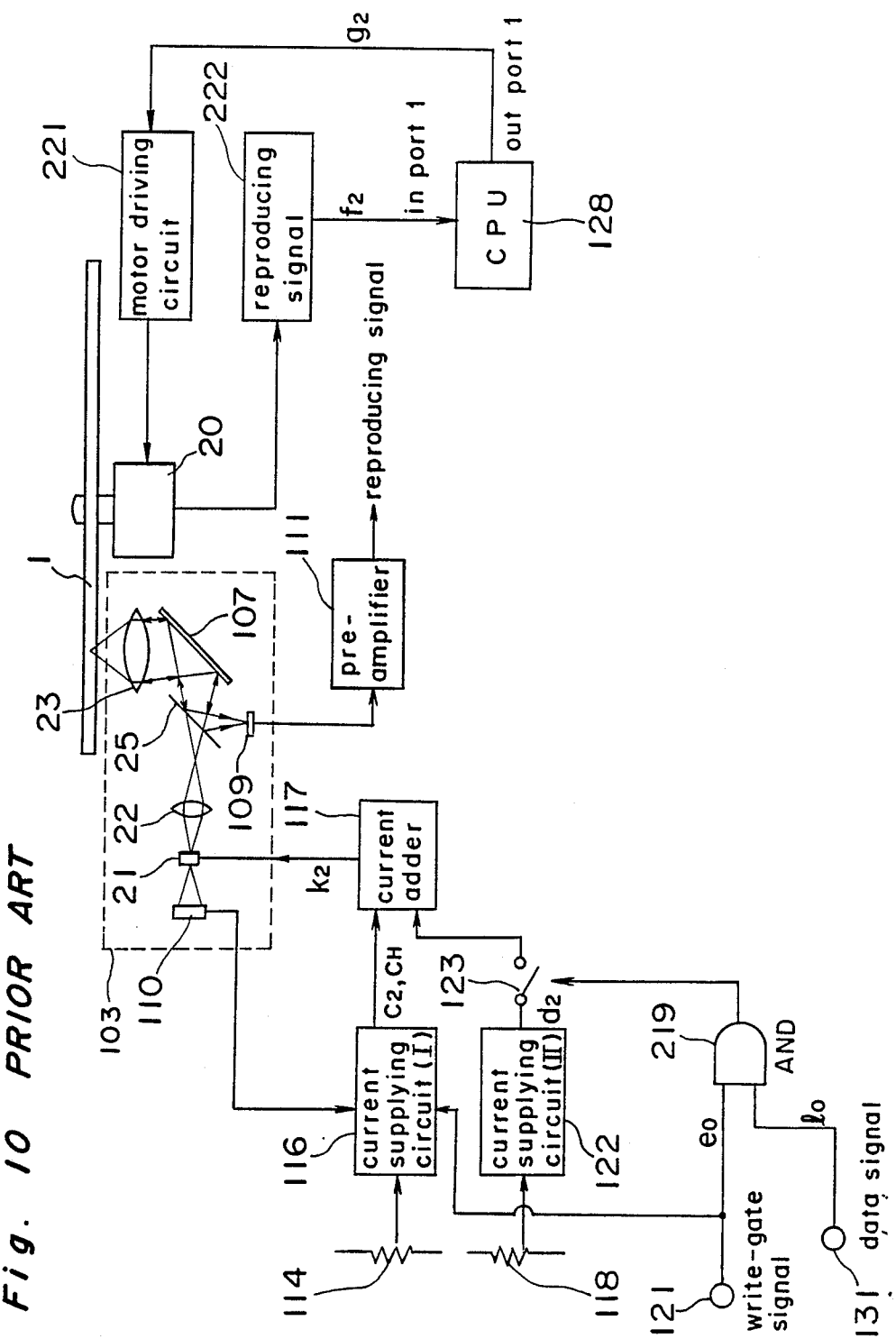
FIG. 10 shows block diagrams showing particularly the record portion and the disc motor portion fully in the conventional embodiment of the optical recording and reproducing apparatus which becomes an object of the present invention.
Figure 11:
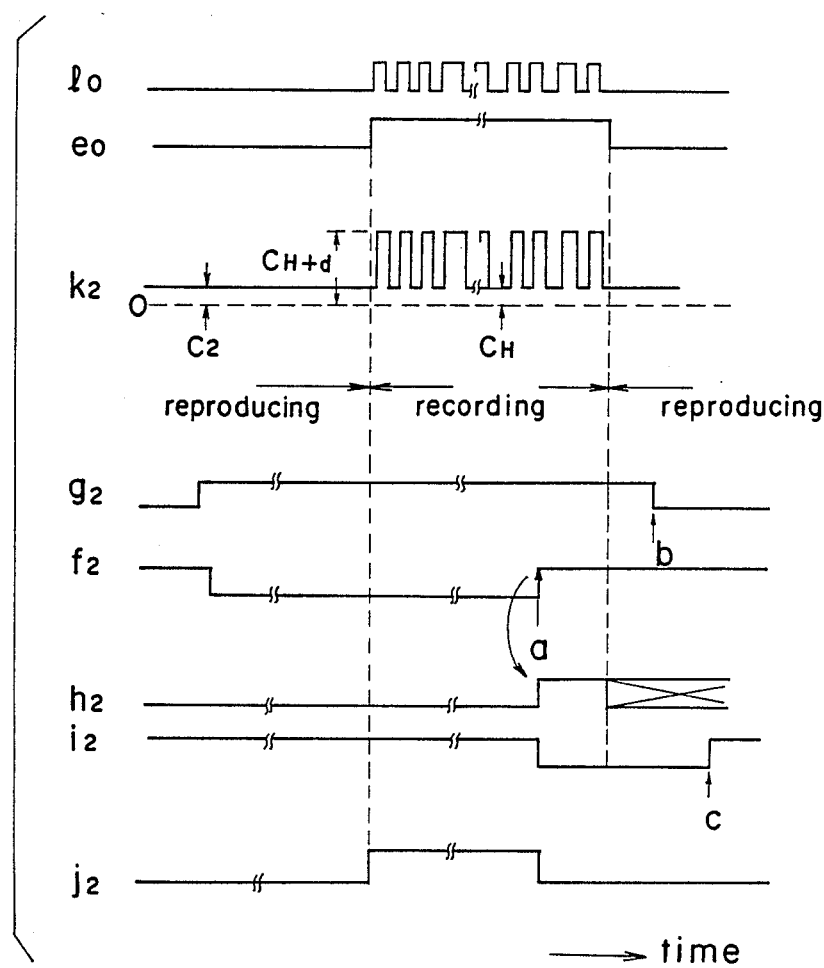

The operation of the present invention will be described with the use of FIG. 9 showing the circuit construction and FIG. 11 showing the operation waveform. In the present invention, the components to be added from FIG. 10 are the AND circuit of 224, 226, the latch circuit of 225, the inport 2 and the outport 2 of the cup 128, the external interface. The operation of the present invention will be described hereinafter. The record reproducing operation with the disc motor 2 being rotated with the normal rotation speed is omitted here, because it is the same as that in the conventional embodiment. The write protecting operation when the disc motor 20 is wrong with the rotation during the recording operation will be described in detail.

Figure 3:
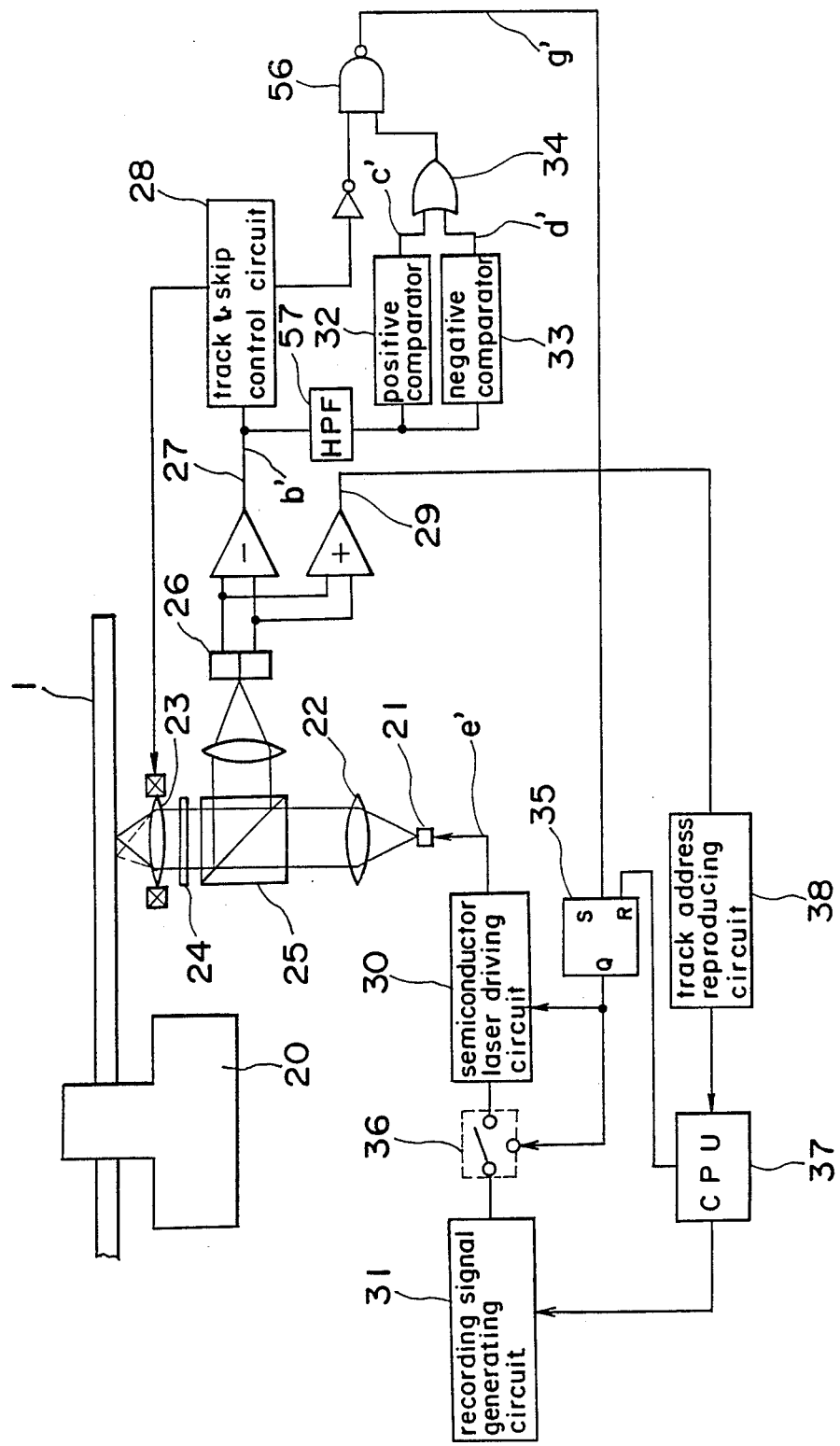
FIG. 3 shows block diagrams of the conventional optical recording and reproducing apparatus.
Figure 4:
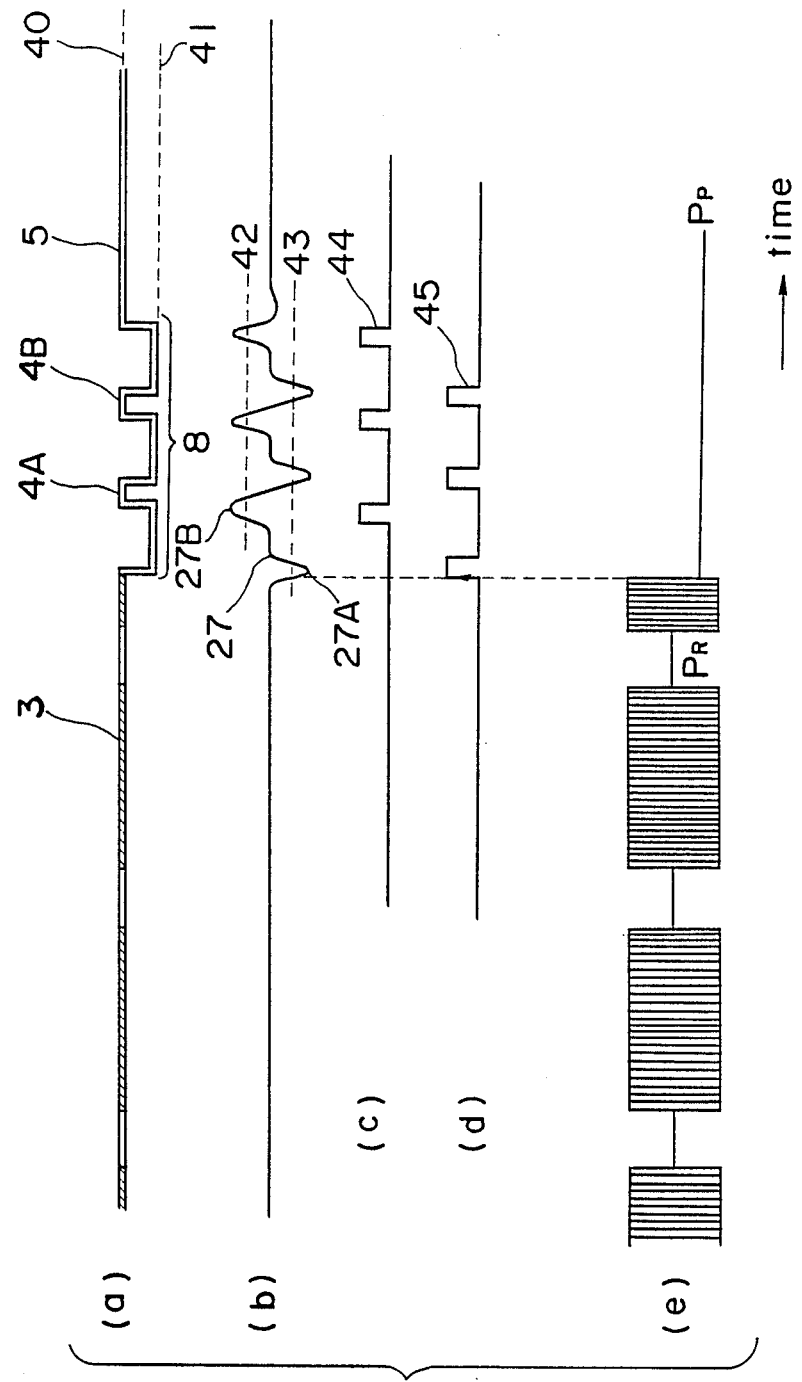
FIG. 4 shows the operation waveform charts of the conventional embodiment.

Now the CPU 128 adds a motor on/off signal g (start with the "1"stop with the "0"), which starts the disc motor 20, to the motor driving circuit 221. In order to record the data on the optical disc 1 when the disc motor 20 is rotating with the normal rotation speed, the write gate signal $e_o$ of the terminal 121 becomes "1" as shown in FIG. 11. The semiconductor laser 21 is oscillated with such driving current as shown in FIG. 22, $k_2$ as described in the conventional embodiment by the data signal $l_o$ of the terminal 131 to record on the optical disc 1 the pit corresponding to the data signal $l_o$. When the revolution number of the disc motor 20 becomes abnormal for some reasons at this time, the detection signal $f_2$ form the motor synchronism detecting circuit changes into the "1" level of the motor synchronism error from the "0" level at the time of the motor synchronous OK as shown in the (a) of the $f_2$ of FIG. 11. This motor synchronous signal $f_2$ and the write gate signal $e_o$ are added into the AND circuit 224 to provide such a signal as shown in FIG. 3, $h_2$. The output $i_2$ of the $\overline{Q}$ becomes "0" level since the motor synchronous signal $f_2$ become the motor synchronous error at a time point shown in the (a). The original write gate signal $e_o$ of the terminal 121 is forced to close by the AND 226 and the condition becomes as shown in FIG. 11, $j_2$. Namely, the write protecting circuit 227 is composed of the AND circuits 224, 226, the D-F.F. 225. When the write protecting function works, the function $i_2$ of the D-F.F. 225 is added into the interruption input which is the input port of the CPU 128, so that the CPU 128 recognizes that something has gone wrong with the disc motor portion. The CPU 128 performs the aborting processing operation to report through the internal interface 227 that the light fort has been caused in the external host during the processing operation, to issue instructions to stop the disc motor 20 to the motor driving circuit 221 as shown in FIG. 3, $g_2$, (b). Finally, the D-F.F 225 is cleared (shown in FIG. 3, (c)) by the outport of the CPU 128 to complete a series of processing operation.

Figure 12:
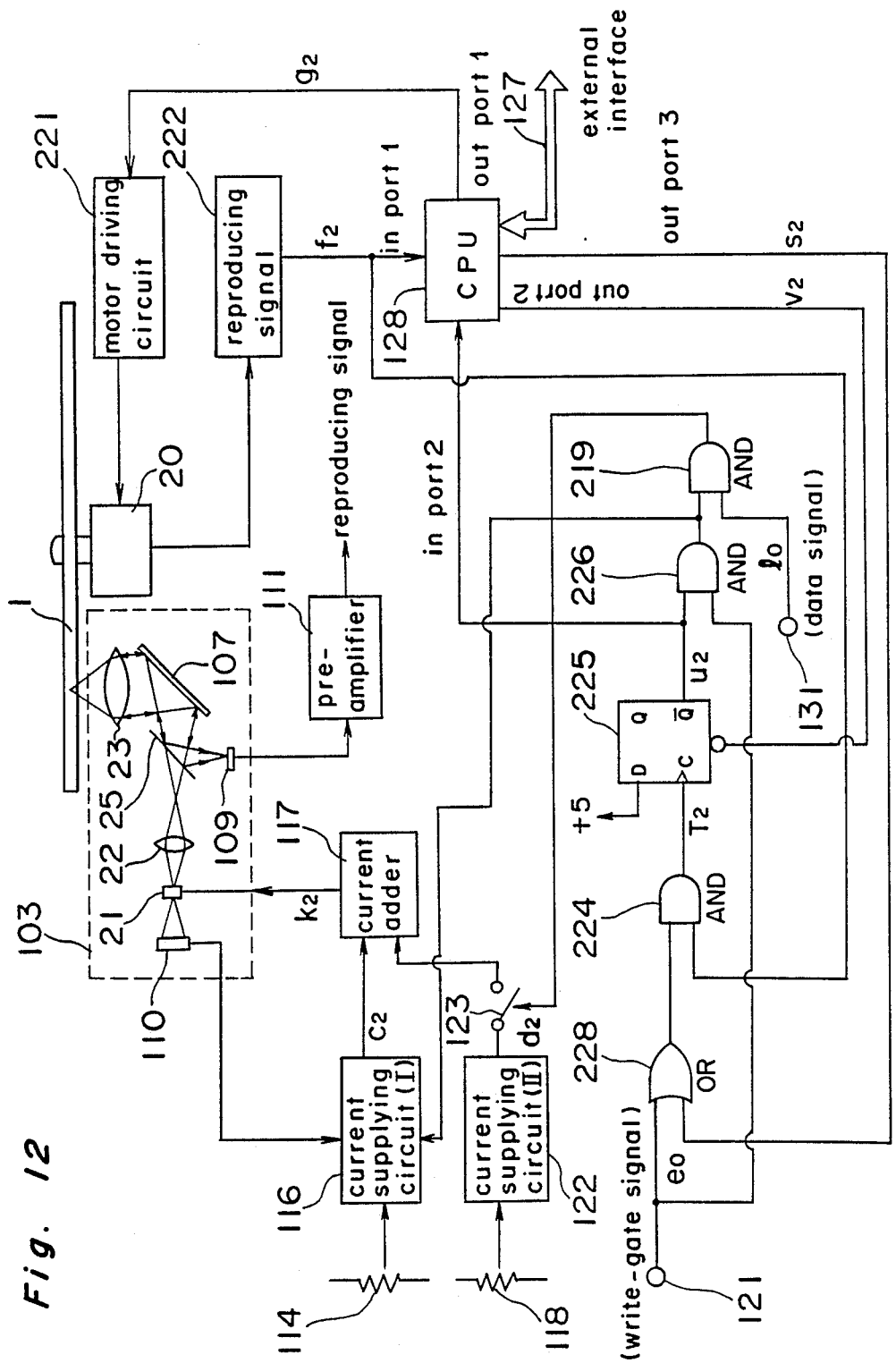
FIG. 12 shows block diagrams showing a fourth embodiment in the present invention.

The fourth embodiment of the present invention is shown in FIG. 12. The write protecting circuit portion of FIG. 9 is mainly shown in FIG. 2. The components to be added from FIG. 9 in the fourth embodiment of the present invention are the OR circuit 228 and the out ports 3 of the CPU 128.

Figure 16:
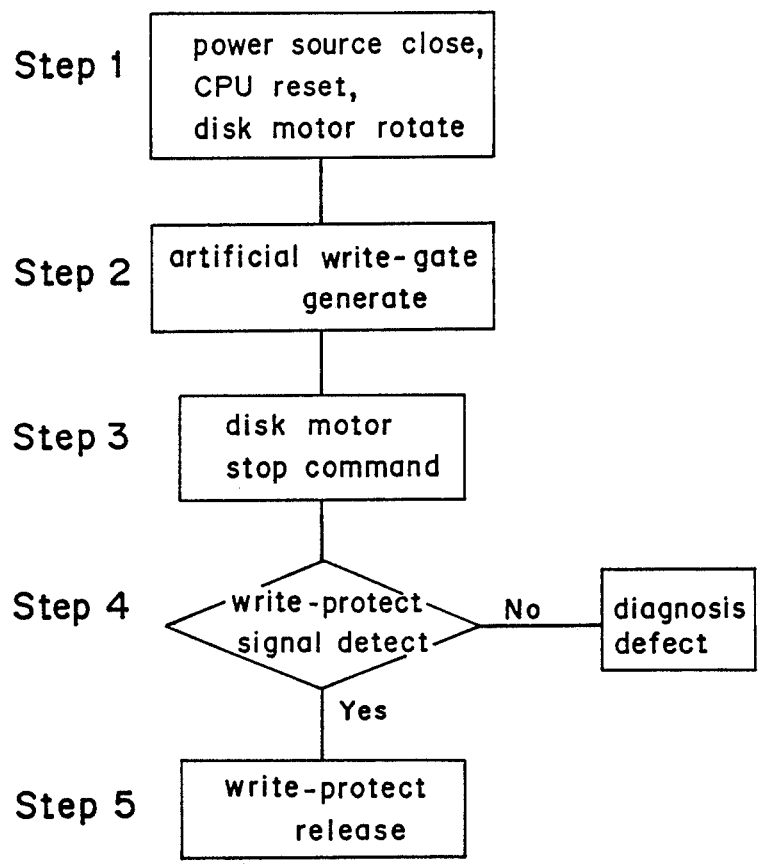

The operation of the present invention will be described hereinafter with the reference to FIG. 12, FIG. 13 and the flow chart of the program of the CPU shown in FIG. 16.

The CPU 128 will carry out the following procedures with the power supply ON of the optical recording and reproducing apparatus or by the diagnosis command from the host. With the disc motor 20 stops as the step 1, the CPU 123 adds the signal $g_2$ (shown in FIG. 13), which rotates the disc motor 20, to the motor driving circuit 221 from the outport 1 to rotate the disc motor 20 at the normal rotation speed. At this time, the detecting signal f from the motor synchronous detecting circuit 222 becomes the motor synchronous OK as shown in FIG. 13 (d) and becomes the "0" level.

Figure 13:
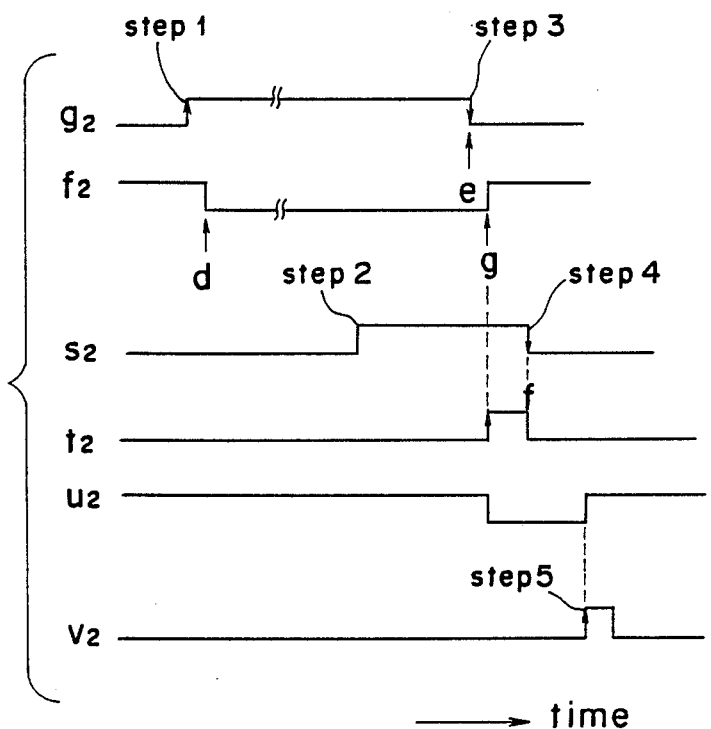
FIG. 11, and FIG. 13 are operation waveform charts which are used in the explanation of the conventional example, and the present invention.

Then, as the step 2, the CPU 128 outputs FIG. 13, $S_2$ as the artificial write gate from the outport 3 to artificially put the optical recording and reproducing apparatus into the record mode. In the $S_2$, the level is the "1" level at the recording time. At this time, the artificial write gate $S_2$ is added into one input of the AND circuit 224 through the OR circuit 228. As the step 3, the CPU 23 intentionally issues the signal for stopping the disc motor 20, i.e. the "0" level as shopping in FIG. 5, (e), the motor ON/OFF signal $g_2$ of the outport 1. At this time, the motor synchronous signal $f_2$ from the motor synchronous detecting circuit 222 is slightly behind the (e) as shown in FIG. 13, (g) and changes into the motor synchronous error "1" level) from the motor synchronous OK ("0" level). This motor synchronous signal $f_2$ is added to the other input of the AND circuit 224. And the output of the AND circuit 224 becomes FIG. 13, $T_2$, the D-F.F 225 is set by the rising edge of this $T_2$, so that the output $u_2$ of the $\overline{Q}$ is added to the inport 2 as the interruption to the CPU 128. As the step 4, the CPU 128 detects that the write protecting function has functioned through the inputting operation of the interruption stop the output of the artificial write gate signal $S_2$ of the output port 3 a shown in FIG. 5, (f). As the step 5, the CPU 23 outputs the clear pulse $v_2$ (shown in FIG. 5) from the out port 2 to clear the D-F.F 225 to restore the condition into the initial condition.

The diagnosis for confirming the write protecting function is completed by the above-described steps 1, 2, 3, and 4.

The write gate is compulsorily stopped even if the disc motor 20 is caused not to be rotated by the normal rotation speed because of something wrong with the disc motor 20 or the motor driving circuit 221 when the user is writing the data on the optical disc which is the recording medium by the addition of the simple hard, soft. Namely, the write protecting function works. And it may notify the user that the condition of this light fort has been caused. Also, it may be confirmed in advance that the disc motor rotates to sometimes cause something wrong during the recording operation which is the above-described effect to operate the write protecting function, a function notifying the user that the condition of the light fort has been caused positively works. Thus, the user does not damages the record medium at this time, the data which have been tried to be saved for the optical disc which is the record medium are not lost, also this function is guaranteed, so that the user may easily use the optical recording and reproducing apparatus as the external memory apparatus.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An optical recording and reproducing apparatus comprising an optical recording and reproducing means for focusing a laser light source onto an optical disc to record or reproduce the information, an abnormal record detecting means which detects that the abnormal condition has been caused where the normal record operation cannot be effected when the information is recorded by the optical recording and reproducing means onto the optical disc, a write protecting means for changing from the recording state to the non-recording state the optical power level of the laser light source during the recording operation by said abnormal record detecting means, a diagnostic means for confirming that said abnormal record detecting means and said write protecting means normally operate.

2. An optical recording and reproducing apparatus in accordance with claim 1, wherein the diagnostic means comprises a means for generating artificial write gate signals which do not become under the recording state, an abnormal operation generating means for causing, without changing the optical power level of said laser light source into the recording state the artificial abnormal operation similar to the abnormal condition to be caused at the recording time during the artificial write gate signal generating period, a means for detecting the abnormality detecting signal generated in accordance with the abnormal operation caused by said abnormal operation producing means through said abnormal record detecting means, also for confirming that said write protecting means normally operates in accordance with it.

3. An optical recording and reproducing apparatus in accordance with claim 1, wherein said optical disc has a guide track, said abnormal record detecting means is composed of an abnormal track skip detecting means for detecting by the track crossing signal that the track skipping has been caused to the other guide track from the guide track which is recording the information.

4. An optical recording and reproducing apparatus in accordance with claim 3, wherein the diagnostic means is adapted to confirm the normal operation of the skip detecting means and write protecting means in addition to a means for geenrating the artificial write gate signal which does not become the record condition, a means of starting the normal track jump during the artificial write gate signal generating period to generate the track crossing signal, a track skip detecting means and a write protecting means.

5. An optical recording and reproducing apparatus in accordance with claim 1, wherein the abnormality detecting means is composed of a optical power abnormality detecting means for detecting the abnormal condition where the light power during the recording operation of the laser light source is not the recording power.

6. An optical recording and reproducing apparatus in accordance with claim 5, where the diagnostic means generates the artificial write gate signal which does not become the recording state, causes the artificial optical power abnormal condition similar to the abnormal condition to be caused at the recording time during the artificial write gate signal generating period to generate the optical power abnormality detecting signals to confirm the normal operation of said optical power abnormality detecting means and said write protecting means.

7. An optical recording and reproducing apparatus in accordance with claim 1, wherein the motor driving means for rotating said optical disc is provided, said abnormality detecting means is composed of a motor rotation abnormality detecting means which detects the abnormal condition of the rotation speed or the rotation synchronism of the motor when the information is recorded on said optical disc by said the optical recording and reproducing means.

8. An optical recording and reproducing apparatus in accordance with claim 7, wherein the diagnostic means generates the artificial write gate signal which does not become the recording state, causes the artificial light power abnormal condition similar to the abnormal condition to be caused at the recording time during the artificial write gate signal generating period to generate the motor rotation abnormality signals to confirm the normal operation of said motor rotation abnormality detecting means and said write protecting means.

* * * * *